May 9, 1961  S. LEES  2,983,149
INTEGRATING ANGULAR ACCELEROMETER
Filed Jan. 23, 1958

INVENTOR.
Sidney Lees
BY
his atty

United States Patent Office 2,983,149
Patented May 9, 1961

2,983,149

INTEGRATING ANGULAR ACCELEROMETER

Sidney Lees, 544 Walnut St., Newton, Mass.

Filed Jan. 23, 1958, Ser. No. 710,650

9 Claims. (Cl. 73—503)

This invention relates to acceleration measuring devices and more particularly comprises a new and improved integrating angular accelerometer.

Technological developments in recent years have created a need for a small and inexpensive instrument which is capable of measuring changes in angular velocity directly. In my copending application Serial No. 655,035, filed April 25, 1957, I have disclosed a device for measuring changes in velocity of a translationally moving body. In the instant case related principles are applied to measure changes in velocity of angularly moving bodies.

The primary object of my invention is to provide a small, rugged and inexpensive device capable of measuring changes in angular velocity.

Another important object of my invention is to provide an angular accelerometer which has a minimum of parts and which requires no external integrating equipment.

To accomplish these and other objects, my invention includes a case which is adapted to be connected to and rotated with a body whose changes in velocity are to be measured. A closed continuous loop in the case is so disposed that the area enclosed by the loop has a finite projected area in a plane perpendicular to the axis of rotation of the body. This passage is completely filled with a Newtonian fluid. The fluid is allowed to move in the closed passage in response to acceleration of the case. A portion of the passage has a cross sectional area which is substantially less than the cross sectional area of the remaining portion of the passage. This restricted portion of the passage provides amplified viscous damping and together with the viscosity of the liquid introduces the integrating functions into the device. A signal generator is disposed in the unrestricted portion of the passage and responds to movement of the fluid. The signal generator may take any number of different forms. In one embodiment of my invention, a float is disposed in the liquid in the unrestricted portion of the passage and the density of the float is exactly equal to the density of the fluid. Means are provided for yieldably retaining the float in a reference position, that is, a position normally assumed by the float in the absence of displacement of the liquid. An E-shaped magnet disposed immediately adjacent the passage may be employed to measure the displacement of the float and thus the displacement of the liquid.

In another embodiment of my invention, a very thin and flexible diaphragm extends across the unrestricted portion of the passage. A plate covered with a lattice of perforations is disposed adjacent to but spaced from the diaphragm. A bridge circuit which includes the plate and diaphragm produces a signal which is a function of the distance between these two elements. As will be more fully described in the following detailed description, the movement of the float or the diaphragm is a measure of the change in velocity of the body imparting rotation to the case.

These and other objects and features of my invention along with incident advantages will be better understood and appreciated from the following detailed description of a number of embodiments thereof, selected for purposes of illustration and shown in the accompanying drawings in which.

Figure 1:
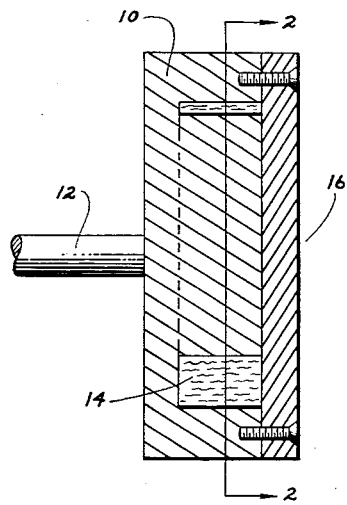
Figure 1 is a cross sectional view of an integrating angular accelerometer constructed in accordance with my invention.
Figure 2:
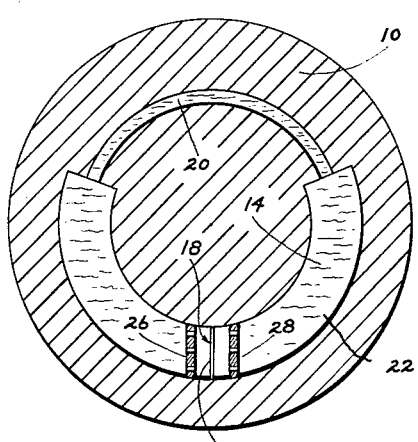
Figure 2 is a cross sectional view taken along the corresponding section line in Figure 1.

The embodiment of my invention shown in Figures 1 and 2 includes in its general organization a case 10 rigidly connected to a shaft 12, an annular passage 14 formed in the case 10, a cover member 16 and a signal generator 18.

The shaft 12 secured to the case 10 is adapted to be used to connect the instrument to a body whose changes in angular velocity are to be measured. Although I have shown a shaft for this purpose, it is to be understood that any form of coupling device may be used.

Referring to Figure 2, the reader will observe that the case 10 is cylindrical in shape and the passage 14 forms a closed and continuous annular loop concentric with the case 10. The passage 14 is generally divided into two portions, one portion 20 of greatly reduced cross sectional area and a second portion 22 of larger cross sectional area. The signal generator 18 is disposed in the larger portion 22.

The signal generator 18 includes an extremely thin and flexible diaphragm or membrane 24 which extends across the enlarged portion 22 of the passage 14. This diaphragm 24 is secured to the marginal walls of the passage 14 and is impervious to the fluids contained within the passage. Thus, fluid within the passage may not pass through the diaphragm from one side of the enlarged portion 22 to the other.

Disposed on each side of the membrane or diaphragm 24 are perforated walls 26 and 28. These walls are rigid, i.e., unyielding to any pressure applied to them by the fluid within the passage unlike the flexible diaphragm 24 which will yield easily to any forces applied against it and which exerts negligible elastic restraint. As will be described more fully below, the diaphragm 24 and the plates 26 and 28 define a pair of capacitors which are used in the circuit of Figure 5 to measure the changes in angular velocity.

The passage 14 including the restricted portion 20 and the enlarged portion 22 is completely filled with a viscous Newtonian liquid. This liquid serves as a sensing element to detect changes in angular velocity and actuates the capacitors which in turn produce the electrical signal. Newtonian liquid is defined as a liquid whose coefficient of viscosity is independent of the shear rate. This definition, which is universally accepted in the art, is found in American Institute of Physics Handbook, published by McGraw-Hill, 1957, page 2–201.

In the following paragraphs I will demonstrate mathematically that the displacement of the liquid in the passage 14 is directly proportional to the changes in angular velocity of the case 10 and thus the body to which the case is connected.

Inertial pressure drop of the liquid in the passage, ignoring the variations of liquid acceleration in the various sections of the passage, may be approximated by $$-\rho(L_1+L_2)R\ddot{A}_{(x-\text{Lt})}$$

Viscous drag pressure drop of the liquid in the passage=

$$-f_g \mu L_2 \frac{a_1}{a_2} R \dot{A}_{(C_a-L_i)}$$

where:

$f_g$ is a geometric factor determined by the cross sections of the passage;
$\mu$ is the viscosity of the liquid;
$\rho$ is the density of the liquid;
$L_1$ is the length of the unrestricted passage;
$L_2$ is the length of the restricted passage;
$a_1$ is the cross sectional area of the unrestricted passage;
$a_2$ is the cross sectional area of the restricted passage;
$\ddot{A}_{(I-Li)}$ is the angular acceleration of the liquid with respect to the inertial space in the vicinity of the signal generator;
$\ddot{A}_{(C_a-Li)}$ is the angular velocity of the liquid with respect to the case in the vicinity of the signal generator; and
R is the mean distance of the entire passage from the axis of rotation of the case.

Note that $$\ddot{A}_{(I-Li)} = \ddot{A}_{(I-C_a)} + \ddot{A}_{(C_a-Li)}$$

where $\ddot{A}_{(C_a-Li)}$ is the angular acceleration of the liquid with respect to the case in the vicinity of the signal generator.
$\ddot{A}_{(I-C_a)}$ is the angular acceleration of the case with respect to inertial space.

The sum of the pressure drops must be equal to zero. Thus inertial pressure drop+viscous drag pressure drop=0

Therefore, in the vicinity of the signal generator $$\rho(L_1+L_2)a_1 R \ddot{A}_{(C_a-Li)} + f_g \mu L_2 \left(\frac{a_1}{a_2}\right)^2 R \dot{A}_{(C_a-Li)}$$
$$= -\rho(L_1+L_2)a_1 R \ddot{A}_{(I-C_a)}$$

Thus, if the design of the instrument is such that $\rho(L_1+L_2)a_1 R \ddot{A}_{(C_a-Li)}$ can be neglected compared to the other terms in the equation, then $$f_g \mu L_2 \left(\frac{a_1}{a_2}\right)^2 R \dot{A}_{(C_a-Li)} = -\rho(L_1+L_2)a_1 R \ddot{A}_{(I-C_a)}$$

or $$\dot{A}_{(C_a-Li)} = \frac{-\rho(L_1+L_2)a_1}{f_g \mu L_2 \left(\frac{a_1}{a_2}\right)^2} \ddot{A}_{(I-C_a)}$$

Thus the displacement of the liquid with respect to the case is equal to $$A_{(C_a-Li)} = S \int_0^t \ddot{A}_{(I-C_a)} dt$$

Where $$S = \frac{-\rho(L_1+L_2)a_1}{f_g \mu L_2 \left(\frac{a_1}{a_2}\right)^2}$$

From the foregoing mathematical analysis of the displacement of the fluid, it is clear that any means for measuring the displacement disposed in the unrestricted portion of the passage will in fact measure the change in angular velocity of the case. The viscosity of the liquid plus the geometry of the device provides the self integrating property which is so desirable.

Figure 5:
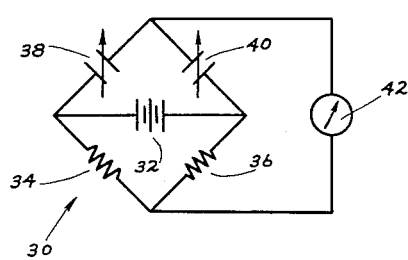
Figure 5 is a schematic diagram of a measuring circuit which can be incorporated into the device shown in Figures 1 and 2 to render a direct measurement of the change in angular velocity.

In the embodiment of Figure 2, the diaphragm 24 together with the two plates 26 and 28 form variable capacitors and are connected within the bridge circuit 30 shown in Figure 5. The bridge circuit includes a power source 32 which may be in the form of a battery, and a pair of resistances 34 and 36. The capacitors 38 and 40 which are formed respectively by the plate 26 and the diaphragm 24, and the plate 28 and the diaphragm 24, complete the bridge. Each side of the diaphragm 24 and the opposed faces of the plates 26 and 28 are coated with a conductive material which is properly insulated from the casing 10. By connecting the bridge in this way, it is obvious that the meter 42 connected across the bridge 30 will detect a signal proportional to the displacement of the diaphragm 24. If the liquid as shown in Figure 2 displaces clockwise in the passage 14 relative to the case 10, the gap between the diaphragm 24 and the plate 26 will decrease while the gap between the diaphragm 24 and the plate 28 will increase. It should be understood that the holes formed in the plates 26 and 28 permit the liquid within the passage 14 to circulate.

Figure 3:
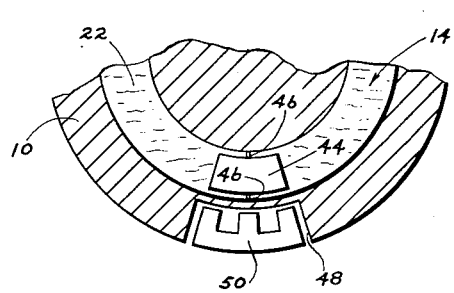

In the embodiment of my invention shown in Figure 3, a different signal generator is employed. The signal generator includes a float 44 which is of the same density as the liquid which fills the passage 14. A pair of thin wires 46 are connected between the float 44 and the walls of the passage 14 and serve to yieldably retain the float in a reference position. Obviously numerous other means can be used to hold the float in its reference position. Moreover, if the density of the float matches the liquid in which it is suspended, it is unnecessary to restrain the float in its reference position. It is only necessary that means be provided to restore the float to its reference position after it has been displaced with the liquid. Any electrical or magnetic force generator could be used for this purpose. The wires 46 exert substantially no restraint upon the float and thus it is allowed to move in the passage 14 in response to pressure of the liquid. Disposed in a cavity 48 within the outer wall of the case 10 is an E-shaped magnet 50. Those skilled in the art will appreciate that movement of the float 44 will be detected by the magnet 50 by virtue of changes in the areas between the pole faces of the magnet and the block. Thus, the float and magnet provide means for measuring inductively the displacement of the liquid. It should be appreciated that the float 44 in effect is part of the liquid within which it is suspended for its density is equal to the density of the liquid. Thus, the float 44 will move with and not relative to the liquid in response to changes in velocity of the case.

Figure 4:
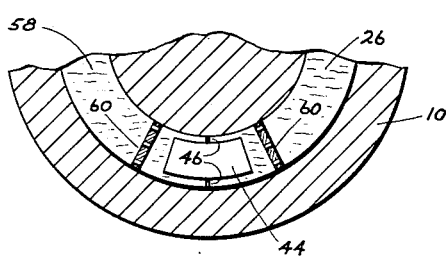
Figures 3 and 4 are fragmentary views in cross section of other embodiments of my invention.

Although I have suggested means for measuring the displacement of the liquid both inductively and capacitatively, it should be understood that the measurement may be made resistively as well. Such an arrangement is shown in Figure 4. The float 44, identical to the float in the embodiment of Figure 3, is disposed between a pair of perforated plates 60, and the passage 26 is filled with a conductive liquid 58. The ends of the float adjacent the plates are coated with a conductive material and serve as a pair of movable electrodes between the fixed electrodes or plates 60. The resistance between the fixed and movable electrodes obviously varies with the distance between them and when connected in a bridge circuit, such as shown in Figure 5 (the plates of the capacitors 38 and 40 are replaced by the electrodes), a signal is generated proportional to the displacement of the float and the change in angular velocity of the case.

Although my device is capable of measuring instantaneous changes in velocity of the case 10 and more particularly of the body to which the case is connected, it is insensitive to translational motion as well as to any angular motion about an axis normal to the shaft 12. Moreover, although I have illustrated the passage 14 as concentric with and lying in a plane normal to the axis of rotation of the case, it should be understood that the passage need not be confined to that location. It is only necessary that the loop formed by the passage 14 have a finite projected area in the plane perpendicular to the axis of rotation. Just so long as this condition exists, the fluid within the passage will displace relative to the case in response to any change in velocity about the shaft axis. When the loop is confined to the plane illustrated, all extraneous motions of the case 10 about other axes transverse to the axis of the shaft 12 will be resolved.

Those skilled in the art will appreciate that numerous modifications may be made of my invention without departing from its spirit. Therefore, I do not intend to limit the breadth of my invention to the foregoing embodiments illustrated and described. Rather, it is my intention that the breadth of my invention be determined by the appended claims and their equivalents.

What I claim as new and desire to secure by Letters Patent of the United States is:

1. An integrating accelerometer adapted to measure changes in angular velocity of a rotary body comprising a case, means for securing the case to the rotating body, a closed endless passage formed in the case and lying in a plane normal to and extending about the axis of rotation of the body, means restricting the cross sectional area of a portion of the passage, said passage being free of bypasses about the restricted portion of the passage, a viscous Newtonian liquid filling the passage including its restricted portion, a float disposed in the liquid and within the unrestricted portion of the passage and displacing in direct response to displacement of the liquid, said float having a density equal to the density of the liquid, means for restoring the float to a preselected reference position in the passage, and means secured to the case for producing an electrical signal which is a measure of the displacement of the float from its reference position.

2. An integrating angular accelerometer comprising a case, a closed and endless passage formed in the case, means for securing the case to a body whose change in angular velocity is to be measured so that the passage has a finite projected area normal to and intersected by the axis of rotation of the body, a Newtonian liquid filling the passage, means restricting the cross sectional area of a substantial portion of the passage, and a signal generator including means disposed in the unrestricted portion of the passage for producing a signal which is a measure of the displacement of the liquid in the passage.

3. An angular accelerometer comprising a case, means for securing the case to a rotating body whose changes in angular velocity are to be measured, a closed and endless passage formed in the case and having a finite projected area normal to and intersected by the axis of rotation of the body, means forming a restriction in a substantial part of the passage, a Newtonian liquid filling the passage, and a signal generator disposed in the passage producing a signal which is a measure of the displacement of the liquid in the passage.

4. An integrating angular accelerometer comprising a case, means for securing the case to a body whose change in angular velocity is to be measured, a passage formed in the case and defining a closed continuous loop, said loop having a finite projected area perpendicular to and intersected by the axis of rotation of the case, means restricting the cross sectional area of a substantial portion of the passage, a Newtonian fluid filling the passage, and a signal generator disposed in the unrestricted portion of the passage and producing a signal which is a measure of the relative displacement of the fluid in the unrestricted portion of the passage.

5. An integrating angular accelerometer as defined in claim 4 further characterized by the signal generator comprising a float disposed in the unrestricted portion of the passage and displaceable with the fluid, said float having a density equal to the density of the fluid in the passage, means for restoring the float to a preselected reference position in the passage, and means disposed adjacent the float sensitive to the displacement of the float from its reference position.

6. An integrating angular accelerometer as defined in claim 5 wherein the last named means includes a magnet disposed in the case adjacent the float and inductively sensing the displacement of the float.

7. An integrating angular accelerometer as defined in claim 5 wherein the liquid is electrically conductive and the last named means includes a pair of fixed electrodes, one on each side of and spaced from the float, whereby the displacement of the float is sensed by the change in resistance between the float and the electrodes.

8. An integrating angular accelerometer comprising a case, means for securing the case to a body whose change in angular velocity is to be measured, a passage formed in the case and defining a closed continuous loop, said loop having a finite projected area perpendicular to and intersected by the axis of rotation of the case, means restricting the cross sectional area of a portion of the passage, a Newtonian fluid filling the passage, a flexible membrane extending across said passage, said membrane being movable in response to movement of the fluid in the passage, a perforated plate extending across the passage and spaced from the membrane, and an electrical circuit which includes the membrane and the plate producing a signal which is a measure of the distance between the membrane and the plate.

9. An integrating angular accelerometer as defined in claim 8 further characterized by said flexible membrane being disposed in the unrestricted portion of the passage.

References Cited in the file of this patent

UNITED STATES PATENTS

| | | |
|---|---|---|
| 1,813,493 | Henderson | July 7, 1931 |
| 2,225,716 | Sexton | Dec. 24, 1940 |
| 2,518,906 | Kocmich | Aug. 15, 1950 |
| 2,644,901 | Hardway | July 7, 1953 |
| 2,778,623 | Statham | Jan. 22, 1957 |
| 2,778,624 | Statham | Jan. 22, 1957 |
| 2,778,905 | Statham | Jan. 22, 1957 |
| 2,840,366 | Wing | June 24, 1958 |

FOREIGN PATENTS

| | | |
|---|---|---|
| 131,184 | Great Britain | Aug. 21, 1919 |